Dec. 17, 1963  J. R. SOLUM ETAL  3,114,422
CEMENT BASKET
Filed Jan. 9, 1961  3 Sheets-Sheet 1

JAMES R. SOLUM
WILLIAM C. HEMPEL
INVENTORS

BY Lyon & Lyon
ATTORNEYS

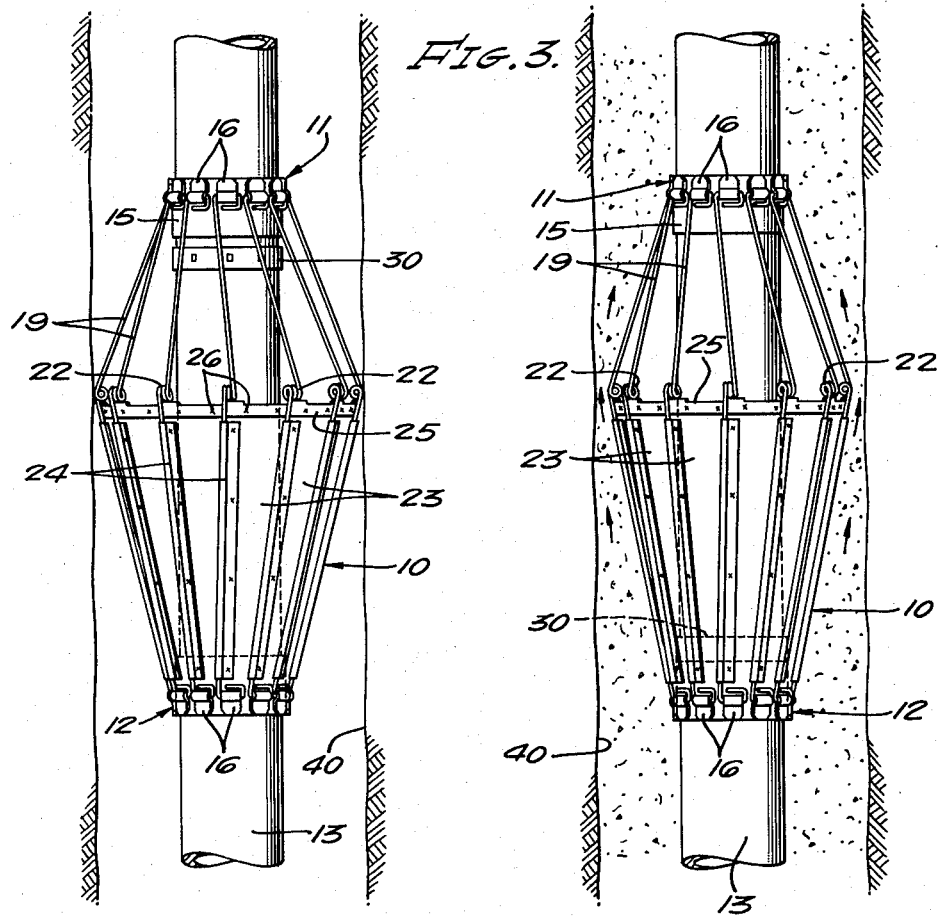
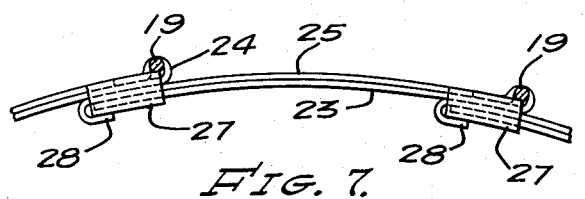
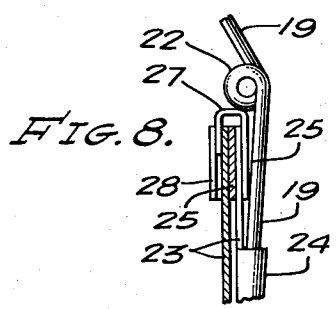
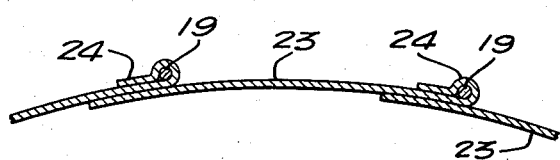
JAMES R. SOLUM
WILLIAM C. HEMPEL
INVENTORS.
BY Lyon Lyon
ATTORNEYS.

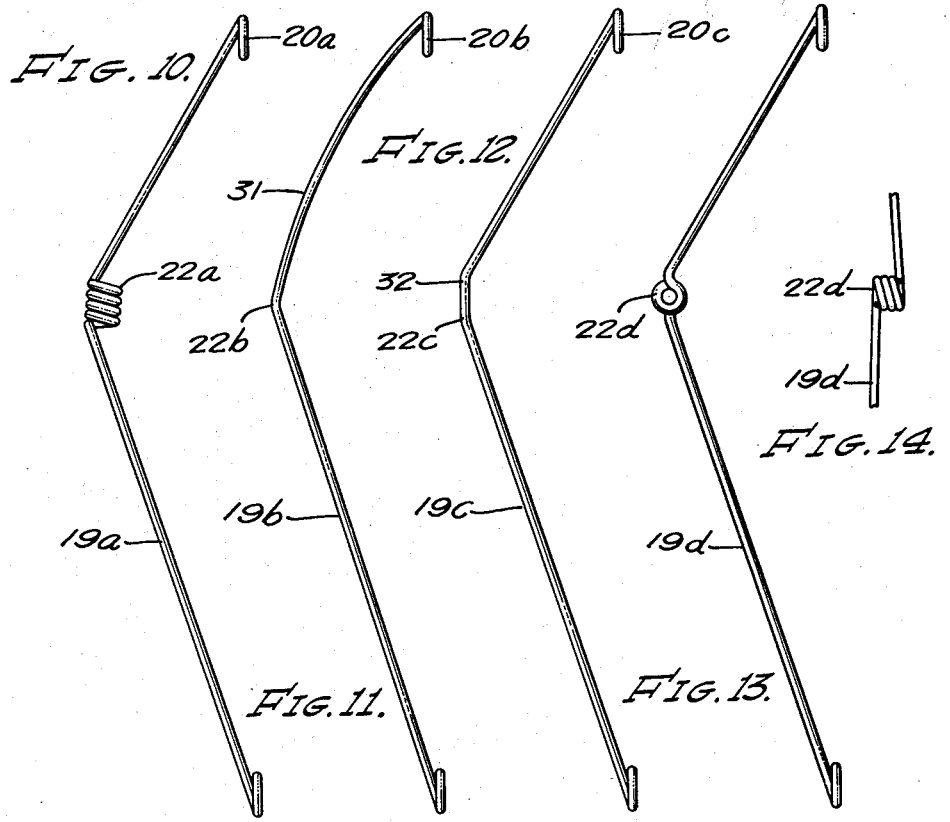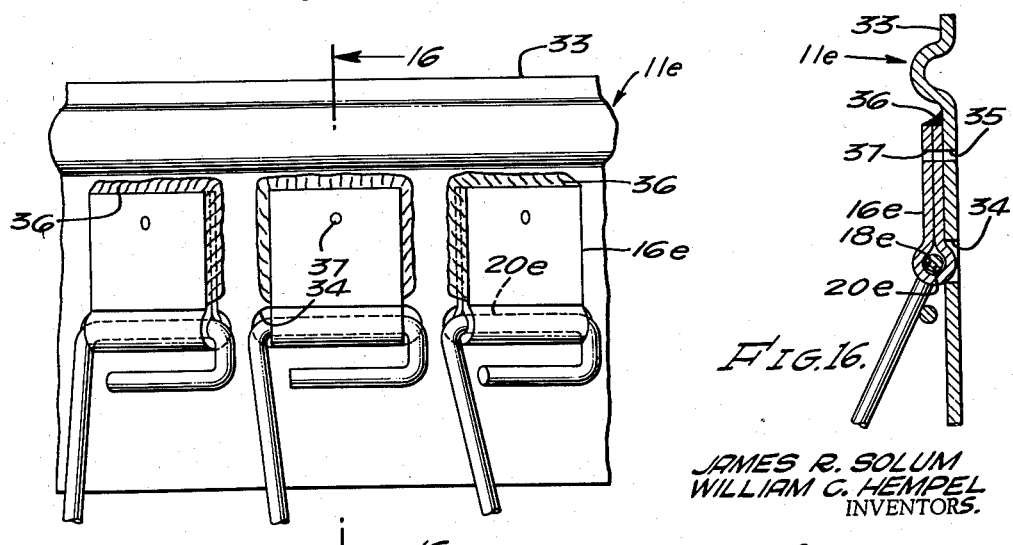

United States Patent Office 3,114,422
Patented Dec. 17, 1963

3,114,422
CEMENT BASKET
James R. Solum, Los Angeles, and William C. Hempel, Manhattan Beach, Calif., assignors to B & W Incorporated, Torrance, Calif., a corporation of California
Filed Jan. 9, 1961, Ser. No. 81,622
15 Claims. (Cl. 166—202)

This invention relates to apparatus for use in the completion of oil wells and in particular relates to a device known as a cement basket.

In the completion of oil and gas wells, it is conventional practice to cement casing and well pipe in the wells at various depths. The cement is placed in the annular space between the well pipe and the wall of the formation to support the well pipe and to seal off certain strata from other parts of the formation. Also, the cementation prevents communication through the well bore of different fluids from separate strata.

In some cementing operations, the cement is pumped down the casing to its lowermost point and up the outside of the casing to the point where the cementation is desired. In other situations, it is the practice to pump the cement out of the casing through a port above its lowermost point and up the annular space to the point where cementation is desired.

When the method whereby the cement is pumped out of the casing at a point above the lower end of the casing is used, it is often desirable to keep the cement from flowing downward in the annular space below where it enters the said annular space. To achieve this, it is common practice to use a cement basket just below this point to support the cement and seal off the formation below.

In other situations after the cement is pumped upward in the annulus, it is necessary to have a device on the exterior of the casing to prevent the cement from coming back down the annular space. This is another purpose served by the cement basket whereby it performs the function of a check valve allowing flow in one direction only.

After the casing is in the well bore with the cement basket in place but before the cement has been introduced or even after introduction of the cement but prior to setting of said cement it may be advantageous to reciprocate the casing. To achieve this, the cement basket must be constructed such that reciprocation does not render it ineffective.

Accordingly, a principal object of this invention is to provide a cement basket of sufficiently rugged and resilient construction to effect a seal between the casing and the wall of the formation and support the annular column of cement.

Another object of this invention is to provide a cement basket which can be reciprocated without rendering it ineffective.

Another object is to provide a device of this type which will allow flow in an upward direction but will prevent any downward flow.

A further object of this invention is to provide a device of this type which provides optimum resistance to upward flow thereby causing turbulence in the fluid passing by it. This resistance to flow being adjustable to different size annular spaces.

Other and more detailed advantages will appear hereinafter.

In the drawings:

FIGURE 2 is an elevational view showing the well tool device mounted on casing and positioned within a well hole.

FIGURE 3 is an elevational view similar to FIGURE 2 showing the well tool device in a partially collapsed condition caused by upward flow of fluid between the exterior of the casing and the well hole.

FIGURE 7 is a plan view of the portion of the device shown in FIGURE 6.

FIGURE 8 is a sectional view taken substantially on line 8—8 as shown in FIGURE 6.

FIGURE 9 is a sectional view taken substantially on line 9—9 as shown in FIGURE 6.

FIGURE 10 shows a modified form of the spring rod used in the device shown in FIGURE 1.

FIGURE 11 is a second modified form of the spring rod used in the device shown in FIGURE 1.

FIGURE 12 is a third modified form of the spring rod used in the device shown in FIGURE 1.

FIGURE 13 is a fourth modified form of the spring rod used in the device shown in FIGURE 1.

FIGURE 14 is a fragmentary elevation of the coil of the spring rod form shown in FIGURE 13.

FIGURE 15 is a fragmentary elevation of a modified form of the collar assembly.

FIGURE 16 is a sectional view taken substantially on line 16—16 as shown in FIGURE 15.

Figure 1:
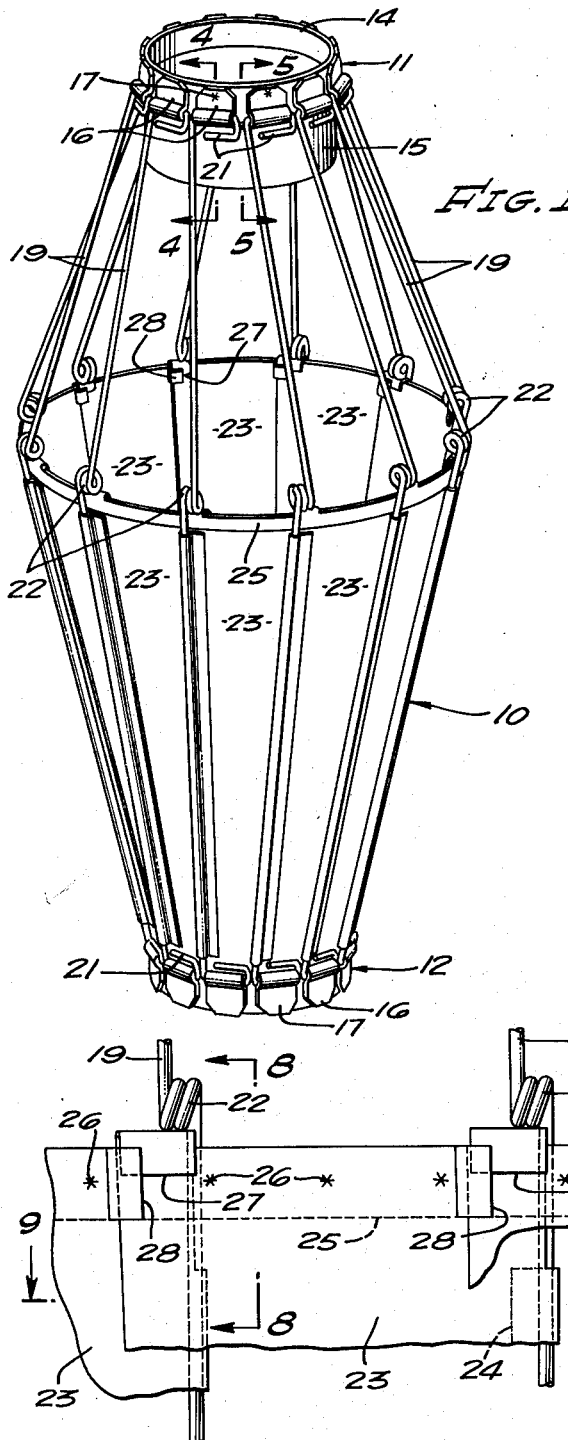
FIGURE 1 is a perspective elevational view showing the well tool device constituting the preferred embodiment of our invention.
Figure 4:
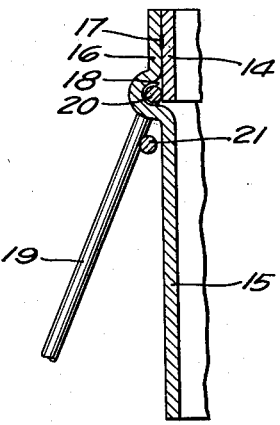
FIGURE 4 is an enlarged detail of a sectional view taken substantially on line 4—4 as shown in FIGURE 1.
Figure 5:
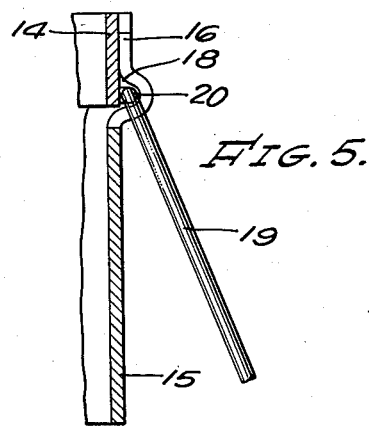
FIGURE 5 is an enlarged detail of a sectional view taken substantially on line 5—5 of FIGURE 1.
Figure 6:
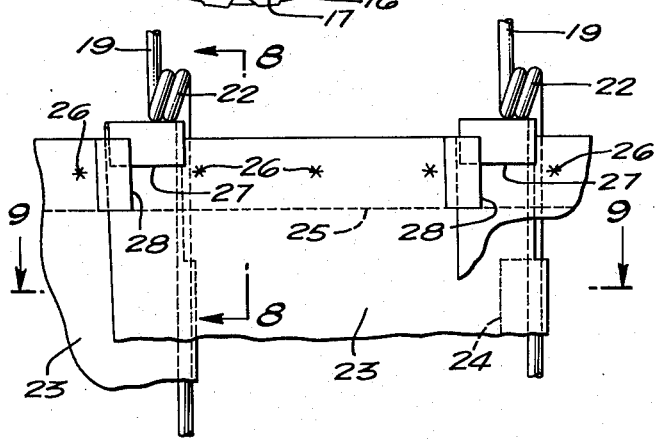
FIGURE 6 is an elevation of a fragmentary portion of the leaf panels of the well tool device as viewed from the inside.

Referring to the drawings, the cement basket generally designated 10, includes a pair of upper and lower spaced collar assemblies 11 and 12, respectively, adapted to be mounted on a well casing 13. Each collar assembly includes an insert ring 14 and a retainer collar 15. Each retainer collar 15 is provided with a plurality of retainer tabs 16 which are affixed to the insert ring 14 by conventional means such as spot weld 17. Each retainer tab 16, in cooperation with the insert ring 14, forms a bearing recess 18.

A plurality of support spring rods 19 extend longitudinally from the upper collar assembly to the lower collar assembly 12. Each support spring rod 19 includes a pivotal journal 20 and a locking foot 21 on each end. Each support spring rod 19 extends outwardly as well as longitudinally and intermediate the ends of each rod is a coil spring knee 22 which is the point on the support spring rod 19 furthest removed from the axis of the collar assemblies 11 and 12.

The pivotal journal 20 is adapted to be received in the bearing recess 18 and may or may not be rotatable therein. The locking foot 21 is provided on the extreme end of each support spring rod 19 to prevent disassembly.

A leaf panel 23 is affixed to each support spring rod 19 along one edge of said leaf panel by the securing tab 24. Each leaf panel 23 is in overlapping relationship with the next adjacent leaf panel 23 and extends along the support spring rod 19 from a point near the pivotal journal 20 secured in the lower collar assembly 12 to a point just below the coil spring knee 22. Each leaf panel extends circumferentially in one direction and terminates just inside the next adjacent leaf panel and spring rod in that direction, as best shown in FIGURE 9. The spring rods are stressed in their assembled condition such as to tend to expand the entire assembly circumferentially and radially. A latch element 25 is secured along the top edge of each leaf panel 23 by any conventional means such as spot weld 26. Each latch element 25 includes a guide tab 27 on one end and stop cleat 28 on the other end. The latch elements 25 are adapted to engage each adjacent latch element 25 to retain the leaf panels 23 in an engaging and overlapping relationship as follows: the guide tab 27 of one latch element 25 extends inwardly over the leaf panel to which it is attached, over the adjacent leaf panel and latch element and then downwardly on the inner side of that adjacent leaf panel; and the stop cleat 28 on that adjacent latch element extends inwardly around the edge of its attached leaf panel, then circumferentially back toward its attached leaf panel and over the inner side of the downwardly extending portion of the guide tab 27 first described.

Thus the stop cleat 28 of one latch element engages the guide tab 27 of an adjacent latch element to limit the circumferential relative movement in one direction (expansion of the assembly) between the leaf panels. Each guide tab 27 also serves to maintain the overlapping-engaging relationship of adjacent leaf panels upon circumferential compression of the assembly since each guide tab is part of a latch element 25 secured to one leaf panel and overlaps and slidably engages an adjacent leaf panel.

The cement basket 10 is installed on the casing 13 by slipping said cement basket on said casing at the desired location. Means may be provided, such as stop collar 30, between the spaced collars 11 and 12 which is secured to the casing 13 and thereby limits relative axial movement of the cement basket on the casing.

In the modified form of our support spring rod 19a shown in FIGURE 10, the coil spring knee 22a replaces the coil spring knee 22 of our preferred embodiment. Furthermore, the coil in this modified form has an axis parallel to the axis of the well casing rather than perpendicular thereto.

In the modified form of our support spring rod 19b shown in FIGURE 11, the coil spring knee 22 of our preferred embodiment is replaced by an outwardly curved segment 31 extending from upper pivotal journal 20b to knee 22b.

In the modified form of our support spring rod 19c shown in FIGURE 12, the coil spring knee 22 of our preferred embodiment is replaced by a double bent knee 22c which has a relatively small straight portion 32 for contact with the well wall.

In the modified form of our support spring rod 19d shown in FIGURES 13 and 14, the coil spring knee 22 of our preferred embodiment is modified by wrapping the coil in the opposite direction resulting in a coil spring knee 22d which upon compression of the spring rod toward the casing coils tighten rather than tending to unwind the coil.

It should be noted that the support spring rod 19 illustrated in our preferred embodiment, FIGURE 1, can be replaced by any of the four modified forms of our support spring rod shown in FIGURES 10, 11, 12 and 13.

By providing these alternate forms, a cement basket is constructed with various additional advantages such as in using the spring rod of FIGURE 11, the basket is able to pass through a restriction without hanging up as it might on the coil spring knee 22 of the preferred embodiment; or in using the spring rod of FIGURE 12 a line contact with the well bore replaces the point contacts of the coil spring knee 22.

In the modified form of our collar assembly shown in FIGURES 15 and 16, the collar assemblies 11 and 12 of our preferred embodiment are replaced by an upper collar assembly 11e and a lower collar assembly (not shown; similar to the upper collar assembly 11e but inverted). Each collar assembly of this modified form has means for retaining the ends of the axially extending support spring rods, said means comprising a collar 33 having a plurality of circumferential slots 34 and pilot holes 35, a retainer tab 16e secured to the collar 33 at each circumferential slot 34 by any convenient means such as weld 36. Each retainer tab 16e has a pilot hole 37 aligned with pilot holes 35 of the collar for ease of alignment in the final assembly, and the tab is provided with a bearing recess 18e for receiving the pivotal journal 20e. In this modified form the inter-relation of the movable elements is substantially the same as in the preferred embodiment but the manufacturing processes are simplified.

When the device of our invention is installed on a well casing 13 and lowered into a well bore 40, the spring rods 19 urge the leaf panels to an expanded relationship such that relatively uniform circumferential contact with the wall of the well bore is established when the fluid in the annulus is static (FIGURE 2). If the pressure differential occurs (such as by introducing a heavier fluid in the annulus above the cement basket) between the upper and lower sides of the leaf panels then such pressure urges the panels outwardly to promote an effective seal between the wall of the well bore 40 and the top edge of the leaf panels. If fluid is circulated upwardly in the annulus from below the cement basket then the spring rods are depressed and the leaf panels contract to permit the circulation (as in FIGURE 3) without adverse structural effect on the cement basket.

Having fully described our invention, it is to be understood we do not wish to be limited to the details set forth herein, but our invention is of the full scope of the appended claims.

We claim:
1. In a cement basket adapted to be mounted on the exterior of a well casing, the combination of: a pair of axially spaced collars connected by a plurality of longitudinally extending and outwardly bowed spring rods, a leaf panel secured to each spring rod and extending upwardly and outwardly from the lower collar to a point intermediate the two collars, said leaf panels overlapping each other circumferentially and defining an upwardly facing basket, and means interconnecting said leaf panels for maintaining said overlapping relation.

2. The combination of claim 1 in which said interconnecting means are comprised of a latch element secured to the upper end of each leaf panel and interconnecting with each adjacent latch element, said latch elements each having a guide tab extending over the top of and overlapping the next adjacent latch element in one circumferential direction, said latch element having a stop cleat for engaging the said guide tab of the next adjacent latch element in the other circumferential direction to limit circumferential movement of those two latch elements away from one another.

3. In a cement basket adapted to be mounted on the exterior of a well casing, the combination of: a pair of axially spaced collars connected by a plurality of longitudinally extending and outwardly bowed spring rods, a leaf panel secured to each spring rod and extending upwardly and outwardly from the lower collar to a point intermediate the two collars, said leaf panels overlapping each other circumferentially and defining an upwardly facing basket, a latch element secured to the upper end of each leaf panel provided with means engaging each adjacent latch element to retain said leaf panels in overlapping relation.

4. In a cement basket adapted to be mounted on the exterior of a well casing, the combination of: a pair of axially spaced collars connected by a plurality of longitudinally extending and outwardly bowed spring rods, a leaf panel secured to each spring rod along one edge of said panel and the opposite edge in overlapping relation with the next adjacent leaf panel, each leaf panel extending outwardly and upwardly from the lower collar to the point on the spring rod at substantially the greatest distance from the axis of the said collars, said leaf panels overlapping each other circumferentially and defining an upwardly facing basket, and means interconnecting said leaf panels for maintaining said overlapping relation.

5. In a cement basket adapted to be mounted on the exterior of a well casing, the combination of: a pair of axially spaced and aligned collars, a plurality of longitudinally extending and outwardly bowed spring rods mounted on the exterior of said collars in circumferentially spaced relationship, each spring rod being comprised of end portions extending laterally at substantially right angles to the length of said spring rod and a body portion extending between and angularly inclined to said collars, a plurality of bearing recess means on said collars retaining said end portions in pivotal relationship to said collars, a plurality of leaf panels each having a pair of longitudinally extending edges, one said edge of each leaf panel being secured to one of said spring rods and the other said edge interiorly overlapping the next adjacent panel and spring rod, each leaf panel extending axially along said spring rod from substantially near the lower end portion of said spring rod to substantially near the point on the said spring rod at the greatest distance from the axis of the said collars and the aggregate of said leaf panels defining an upwardly facing basket.

6. In a cement basket adapted to be mounted on the exterior of a well casing, the combination of: a pair of axially spaced and aligned collars, a plurality of longitudinally extending and outwardly bowed spring rods mounted on the exterior of said collars in circumferentially spaced relationship, each spring rod being comprised of end portions extending laterally at substantially right angles to the length of said spring rod and a body portion extending between and angularly inclined to said collars, a plurality of bearing recess means provided on said collars for retaining said end portions in pivotal relationship to said collars, a plurality of leaf panels each having a pair of longitudinally extending edges, one said edge of each leaf panel being secured to one of said spring rods and the other said edge interiorly overlapping the next adjacent panel and spring rod, each leaf panel extending axially along said spring rod from substantially near the lower end portion of said spring rod to substantially near the point on the said spring rod at the greatest distance from the axis of the said collars, the aggregate of said leaf panels defining an upwardly facing basket, a latch element secured to the upper end of each leaf panel provided with means engaging each adjacent latch element to retain said leaf panels in overlapping relation.

7. In a cement basket adapted to be mounted on the exterior of a well casing, the combination of: a pair of axially spaced and aligned collars, a plurality of outwardly bowed spring rods longitudinally extending between and mounted on the exterior of said collars, each spring rod including end pieces adapted to be secured to said collars, a body length between said end pieces having upper and lower portions inclined to the axis of the said collars and forming an obtuse angle at the junction of said upper and lower portions, a plurality of leaf panels, each leaf panel having a longitudinal edge secured along the said lower portion of one of said spring rods and having a free opposite edge interiorly overlapping the next adjacent leaf panel, the aggregated leaf panels defining an upwardly facing basket comprising substantially the surface of a conical frustum having the smaller end engaging the exterior surface of the lower collar, and means interconnecting said leaf panels for maintaining said overlapping relation.

8. The combination of claim 7 in which the junction of the upper and lower portions of the spring rod is in the form of a coil spring having an axis perpendicular to the axis of the spaced collars.

9. The combination of claim 7 in which the junction of the upper and lower portions of the spring rod is in the form of a coil spring having an axis parallel to the axis of the spaced collars.

10. The combination of claim 7 in which the junction of the upper and lower portions of the spring rod is in the form of a relatively short straight segment parallel to the axis of the spaced collars.

11. The combination of claim 7 in which the upper portion of said spring rod is outwardly bowed and said upper portion joins the lower portion at the point of maximum distance from the axis of the spaced collars.

12. In a cement basket adapted to be mounted on the exterior of a well casing, the combination of: a pair of axially spaced and aligned collar assemblies, each collar assembly including a retainer collar and a ring, each retainer collar having a plurality of tabs protruding outwardly and longitudinally over the associated ring for cooperating with that ring to form a plurality of bearing recesses, a plurality of outwardly bowed spring rods longitudinally extending between said spaced collar assemblies and having end portions retained in said bearing recesses, each spring rod having outwardly and longitudinally extending upper and lower portions between said end portions, a plurality of leaf panels, each leaf panel having a longitudinal edge secured along the lower portion of one of said spring rods and having a free opposite edge interiorly overlapping the next adjacent leaf panel, each said leaf panel extending from the lower collar assembly to the intermediate point on the said spring rod having maximum radial displacement from the axis of the collars, the aggregate of said leaf panels defining an upwardly facing basket, a latch element secured to the upper end of each leaf panel having means engaging each adjacent latch element to retain the said leaf panels in overlapping relation.

13. In a cement basket adapted to be mounted on the exterior of a well casing, the combination of: a pair of axially spaced and aligned collar assemblies, each collar assembly including a plurality of means forming bearing recesses with axes extending generally circumferentially and said means being circumferentially spaced, a plurality of spring rods extending between said spaced collar assemblies and having end portions retained in said bearing recesses, a plurality of leaf panels, each leaf panel having a longitudinal edge secured along one of said spring rods and having a free opposite edge interiorly overlapping the next adjacent leaf panel, each spring rod having outwardly and longitudinally extending portions between said end portions, each said leaf panel extending from the lower collar assembly to the intermediate point on the said spring rod having maximum radial displacement from the axis of the collars, the aggregate of said leaf panels defining an upwardly facing basket, a latch element secured to the upper end of each leaf panel having means engaging each adjacent latch element to retain the said leaf panels in overlapping relation.

14. In a cement basket adapted to be mounted on the exterior of a well casing, the combination of: a pair of axially spaced and aligned collars, a plurality of outwardly bowed spring rods extending longitudinally between and connecting said collars, a plurality of leaf panels, each leaf panel secured to a spring rod and interiorly overlapping the next adjacent spring rod, said leaf panels extending upwardly and outwardly from the lower collar and retained within said spring rods by said secured and overlapping relationship for forming an upwardly facing frustoconical shaped barrier, said spring rods resiliently maintaining the frustoconical shape of said barrier to permit fluid to pass upwardly past the barrier by collapsing the barrier and preventing fluid from passing downwardly by the resilient expansion of said barrier, and a latch element secured to the upper end of each leaf panel and having means for engaging the latch element of each adjacent leaf panel for retaining said leaf panels in overlapping relation against the resilient forces of expansion by said spring rods and during said collapsing of the frustoconical barrier.

15. The combination of claim 14 in which the said means of each latch element for engaging the adjacent latch element are comprised of a guide tab extending over the top of and overlapping the next adjacent latch element in one circumferential direction, and a stop cleat for engaging the said guide tab of the next adjacent latch element in the other circumferential direction to limit circumferential movement of those two latch elements away from one another.

References Cited in the file of this patent

UNITED STATES PATENTS

| | | |
|---|---|---|
| 2,117,538 | Baker | May 17, 1938 |
| 2,253,224 | Bleakley | Aug. 19, 1941 |
| 2,392,145 | Hall | Jan. 1, 1946 |
| 2,652,118 | Hartman et al. | Sept. 15, 1953 |